United States Patent [19]

Sugimoto et al.

[11] Patent Number: 4,481,455
[45] Date of Patent: Nov. 6, 1984

[54] METHOD OF STARTING VARIABLE-SPEED INDUCTION MOTOR

[76] Inventors: Osamu Sugimoto, 2,4-2, Takanodai, Suita-shi, Ohsaka-fu; Shinobu Ishizaka, 2-6-94, Suimeidai, Kawanishi-shi, Ohsaka-fu; Youji Tanaka, 1-5-4-403, Nishinarusawa-cho; Noboru Suzuki, 2-29-21, Nishinarusawa-cho, both of Hitachi, Ibaraki-ken, all of Japan

[21] Appl. No.: 536,871

[22] Filed: Sep. 29, 1983

[51] Int. Cl.³ .............................................. H02P 1/26
[52] U.S. Cl. .................................. 318/778; 318/732; 318/827
[58] Field of Search ............... 318/778, 732, 731, 827, 318/828

[56] References Cited

U.S. PATENT DOCUMENTS 3,683,251  8/1972  Pisecker ............................ 318/828
4,039,909  8/1977  Baker ................................. 318/732
4,074,174  2/1978  Kuge .................................. 318/732

Primary Examiner—David Smith, Jr.
Attorney, Agent, or Firm—Antonelli, Terry & Wands

[57] ABSTRACT

This method of starting a variable-speed induction motor utilizes a speed control of the induction motor by varying the output frequency from a cycloconverter. The method comprises applying an output from the cycloconverter to the secondary winding of the induction motor while the primary winding of the induction motor is short-circuited during the start-up of the motor, applying a voltage lower than the line voltage to the primary winding when the induction motor is operating within an intermediate speed range, and applying the line voltage within a speed region near the rated speed. This method enables speed control over a wide range, and provides a sufficiently large start-up torque for the induction motor.

2 Claims, 1 Drawing Figure

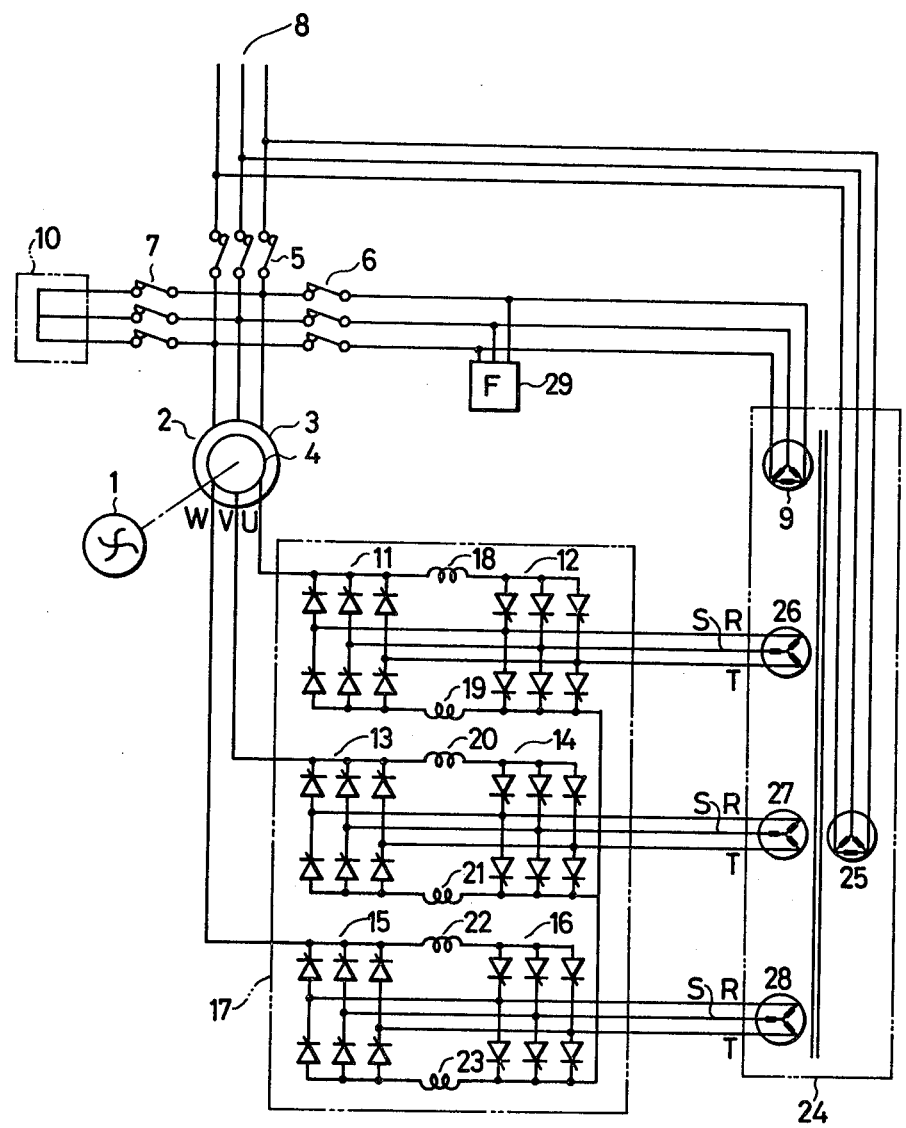

METHOD OF STARTING VARIABLE-SPEED INDUCTION MOTOR

BACKGROUND OF THE INVENTION

The present invention relates to an improvement in the method of starting a variable-speed pump turbine of a pumped storage power station and, in particular, to an improvement in the method of starting a variable-speed pump turbine which is operated at varying speeds as a wound-rotor induction motor.

The current increase in nuclear power plants has given rise to demands for the automatic frequency control of hydraulic power stations to increase the proportion of partial-load operation in these hydraulic power stations. In consequence, there is a need to improve the efficiency of a hydraulic power station during partial-load operation.

In recent years hydraulic power stations have often been built at such places at which differences in the water head are large, due to location restrictions. This in turn requires a suitable countermeasure to prevent any drop in efficiency due to changes in the head.

Some ideas for preventing a drop of efficiency due to changes in the head have been proposed, of these the most practical suggestion is to permit the power generation system to work at a variable speed to improve its efficiency.

In such a power generating system, the efficiency of the water turbine which drives the generator is reduced undesirably when the head decreases, but any drop in efficiency can be suppressed by varying the speed of the water turbine according to the changes in the head. The variable-speed power generation system offers another advantage in that, for a pumped storage power station, the pumping rate can be adjusted to make efficient use of surplus power. Namely, a pumped storage power generation system designed for constant-speed operation requires a constant pump rate or constant electric power and, hence, cannot pump water at a rate matched to surplus power. Adjustment of the operation of a constant-speed pumped storage power plant to obtain a pump rate matched to surplus power would require an impracticably large quantity of equipment for the adjustment.

If the alternator motor is a synchronous motor, a variable-speed operation can be achieved by connecting a thyristor frequency converter between the alternator motor and the power line, and varying the frequency of the converter. In this case, however, the thyristor converter must have a large capacity matched to the maximum level of power generation, so that the production cost and power losses during operation increase.

One solution to this problem is to use a secondary-excitation induction motor as the motor generator. In this case, the secondary-excitation controller is designed to provide a narrow speed control range around the synchronous speed of the induction motor. With this arrangement, it is possible to reduce the capacity of the thyristor converter. There are two systems for connecting the thyristor to the secondary winding of the induction motor to effect secondary excitation speed control: namely a system called the separate-excitation inverter system in which the A.C. current is converted into D.C. current and then back to an A.C. current of a frequency coinciding with the slip frequency of the induction motor; and a cycloconverter system in which A.C. current is produced directly from the A.C. current available. The separate-excitation inverter system, however, has the problem that the primary current waveform sent to the power line has several higher harmonics because the output from the inverter, i.e. the secondary current in the induction motor, has a rectangular waveform. This has an unfavourable effect on the power line, particularly when large-capacity machinery is used. In addition, since a lagging power factor is not possible, the excitation current is supplied from an external power line so that lagging reactive power is consumed, which seriously affects the line voltage. On the other hand, the cycloconverter system produces few higher harmonics because it is possible to use a substantially sine-wave secondary current for the induction motor. In addition, this system enables a control of the line voltage by variation of the power factor of the output to the power line, because it is possible to control the power factor of the output of a cycloconverter.

The cycloconverter system, although it has the above advantages, cannot be applied directly to the start-up of a pump turbine, because its speed can only be controlled within a small range. Namely, in order that this system can be used satisfactorily in the start-up of a pump turbine, it is essential that the output frequency of the thyristor converter can be varied over a wide range between zero and the rated power source frequency. More specifically, in a large-capacity induction motor, the torque increases dramatically in the region near zero slip while, in the region of large slip, the motor does not produce substantial torque. When starting up an induction motor of a pumped storage power station, it is necessary to vary the source frequency of the induction motor so that it always operates in the region near zero slip.

To realize such a control, it is possible to operate the thyristor converter of the cycloconverter as a AC-DC-AC converter only during the start-up of the induction motor. To this end, however, it is necessary to employ a large number of change-over breakers for switching the circuits of the converter. This in turn requires a large installation space within the power plant for the machinery, as well as a complicated sequence for the switching of the circuit, resulting in increased production and installation costs.

SUMMARY OF THE INVENTION

Accordingly, an object of the present invention is to provide a method of starting up a variable-speed induction motor which enables the use of a cycloconverter type of starting system without necessitating any specific equipment, and which can afford a wide speed control range, as well as a large torque, thereby obviating the problems in the prior art.

To this end, according to the present invention, a system consisting of a pump turbine with a variable-speed induction motor connected mechanically to the pump turbine to drive it, and a cycloconverter which converts line frequency into any desired frequency so that the speed of the induction motor is controlled by varying the frequency of the output from the cycloconverter, is provided with a method of starting up the variable-speed induction motor comprising: applying the output from the cycloconverter to the secondary winding of the induction motor while the primary winding of the induction motor is short-circuited during the start-up of the induction motor; applying a voltage of a frequency lower than that of the line voltage to the primary winding when the induction motor is operating at speeds within an intermediate speed range; and applying the line voltage to the primary winding when the induction motor is operating at a speed near its rated speed.

BRIEF DESCRIPTION OF THE DRAWING

The single attached FIGURE is a connection diagram explaining the method of the present invention for starting a variable-speed induction motor.

DESCRIPTION OF THE PREFERRED EMBODIMENT

The invention will be fully described hereinunder with reference to the accompanying drawing.

Referring to the FIGURE which is a connection diagram explaining the method of the present invention for starting a variable-speed induction motor, a pump storage power station has a pump turbine 1 which is driven, when in pumping mode, by a wound-rotor induction motor 2. The induction motor 2 has a primary winding 3 and a secondary winding 4. The primary winding 3 is connected to corresponding circuits through breakers 5, 6 and 7. More specifically, the primary winding 3 of the induction motor 2 is connected to an A.C. line 8 by breaker 5, the output circuit of a transformer by breaker 6, and to a short-circuit circuit 10 by breaker 7.

On the other hand, the secondary winding 4 of the wound-rotor induction motor is connected to a cycloconverter 1 which has grate-connected thyristor circuits 11 to 16. Namely, the U-phase of the secondary winding is connected to thyristor circuits 11 and 12, the V-phase is connected to thyristor circuits 13 and 14, and the W-phase is connected to thyristor circuits 15 and 16.

For example, thyristor circuits 11 and 12 supply the U-phase of the secondary winding with a sine-wave electric current of variable frequency. Which of the thyristor circuits 11 and 12 operates depends on the direction of the secondary current (output current) of the induction motor so that the positive and negative halves of the output current are supplied alternately. D.C. reactors 18 and 19 are provided between thyristors 11 and 12 to prevent short-circuiting and thus avoid any overcurrent if the two thyristor circuits 11 and 12 should accidentally operate simultaneously. Similarly, D.C. reactors 20, 21 and 22, 23 are provided for the V-phase and the W-phase, respectively.

The ends of the thyristor circuits opposite to the induction motor are connected to an insulation transformer 24 which is provided with a primary coil 25 connected to the A.C. line, and secondary coils 26, 27, and 28 each connected to a pair of thyristor circuits. The coils of the low-voltage transformer can also be placed within this insulation tranformer, although this is not essential. Namely, it is not always necessary to wind the coil of the low-voltage transformer around the core of the insulation transformer 24, it is possible to use an independent low-voltage transformer. In general, however, the source or primary current of the cycloconverter contains several higher harmonics and it is necessary to use a filter 29 and a transformer for the filter to prevent the higher harmonics affecting the power line. It is, therefore, a better policy to make the insulation transformer also act as the transformer for the filter, thereby saving on production cost and installation space.

The operation of this device as a motor or an alternator is generally as follows.

In power-generating mode, the wound-rotor induction motor 2 is driven by the pump turbine 1 to generate electric power whereas, in pumping mode, the motor 2 is started and accelerated by the method of the present invention, which will be detailed later, and, after the motor has been accelerated to a speed within the control range around the synchronous speed, i.e. within the voltage-limitation range of the cycloconverter, normal running by secondary excitation starts. By controlling the phase of the output current of the cycloconverter with respect to the voltage of the secondary winding, the induction motor 2 can operate as both an alternator and an induction motor. It is also possible to adjust the electric power output, or the power consumed, by the level of the current output from the cycloconverter 17.

The starting method in accordance with the present invention will now be described. Briefly, the present invention makes use of the fact that the frequency variation range of the cycloconverter is between zero and at most 50% of the power frequency, by selecting either of two starting sequences: a sequence for speeds lower than 50% of the rated speed, and a sequence for speeds higher than 50%. When the speed is below 50% of the rated speed, the induction motor is started with a varying frequency by secondary excitation with the primary side short-circuited; whereas, when the speed exceeds 50% of the rated speed, the induction machine is accelerated by the usual secondary-excitation speed control method while the voltage of the primary side is kept low. In more detail, when the induction motor is started and accelerated from zero to 50% of the rated speed, breaker 7 is kept closed while breakers 5 and 6 are open so that the primary winding 3 is short-circuited by the short-circuit circuit 10, or a resistance circuit (not shown), while the secondary winding 4 is excited with a varying frequency by the cycloconverter 17, thereby starting and accelerating the induction motor with substantially zero slip. Thus, the induction motor is started and accelerated by the usual method, but with the primary and secondary sides swapped. The cycloconverter has fixed voltage limits determined by its fixed speed variation range, e.g. a range of ±X% around the synchronous speed. The voltage limit in this case is about X% of the secondary voltage during the zero-slip operation of the induction motor. Therefore, 100% torque is attainable until the speed reaches X% of the rated speed. However, within the range between X% and 50%, the torque decreases gradually and reaches a minimum value when the speed is increased to 50%, due to V/f (voltage/frequency) limitations, i.e., due to magnetic flux limitations. This minimum torque, however, is still 6 to 8 times that required for starting, because the output required for starting an ordinary thyristor at 100% speed is as little as 6% of the rated output. It is thus possible to obtain a sufficiently large starting torque.

After the induction motor has been started and accelerated to 50% speed in the manner explained above, the primary current is reduced to zero to prevent any overcurrent or transient torque, and then breaker 7 is opened and breaker 6 closed. When closing breaker 6, care must be taken so that, in order to prevent the occurrence of the overcurrents which are peculiar to induction motors, before breaker 6 is close, the secondary excitation of the cycloconverter is controlled to make the primary voltage coincide with a low voltage supplied, for example, from the secondary winding of the low-voltage transformer 9. In the secondary-excitation operation in accordance with the present invention, it is possible to obtain a substantial coincidence between the phase of the voltage of the low-voltage source and the phase of the primary voltage in the induction motor, because the phase of the internally-induced voltage is detected. Thus, the present invention makes it possible to use a less-expensive system for enabling the closing of breaker 6, based solely on the coincidence of voltages, without requiring any synchronization system. After breaker 6 is closed, the induction motor is accelerated up to a speed close to 100% speed within the speed control range, by controlling the phase of the output current of the cycloconverter 17 with respect to the secondary voltage.

One of the characteristic features of the present invention resides in that the voltage applied to the primary winding is kept at a low level until the induction motor has been accelerated up to 50% of the rated speed. It must be understood here that the provision of the cycloconverter for variable-speed power generation is designed to reduce cost by imposing a voltage limit corresponding to the speed control range. When the speed control range is less than 50%, the secondary voltage is the product of the slip S and the secondary voltage $V_2$ obtained when the slip is 1.0, i.e. it is $S \times V_2$. In order to prevent the secondary voltage exceeding the voltage limitations of the cycloconverter, therefore, it is necessary to maintain a sufficiently low primary votage. More specifically, since the secondary voltage reaches a maximum at 50% speed, it is necessary that the secondary voltage in the induction motor at 50% speed does not exceed the voltage output from the cycloconverter, which is about X% of the voltage $V_2$. To this end, it is necessary to reduce the voltage of the primary winding to the level given by the following formula:

$$(X(\%)/50(\%)) \times 100 = 2 \cdot X(\%)$$

The acceleration up to 100% speed is conducted in the manner explained above. After 100% speed has been reached, the control is performed to nullify the current in the primary winding to prevent any overcurrent or transient torque, and then breaker 6 is opened while breaker 5 is closed to start the usual secondary-excitation speed control method. The closing of breaker 5 is made in the same manner as that of breaker 6.

As has been described, the present invention provides a method comprising: applying the output from a cycloconverter to the secondary winding of an induction motor while the primary winding of the induction motor is short-circuited during the start-up of the induction motor, applying a voltage lower than the line voltage to the primary winding when the induction motor is operating at a speed within an intermediate speed range, and applying the line voltage to the primary winding when the induction motor is operating at a speed near its rated speed.

It is therefore possible to effect speed control over a wide range, and start and accelerate a variable-speed induction motor with a sufficiently large torque by a cycloconverter starting method without necessitating any specific equipment.

What is claimed is:

1. In a system consisting of a pump turbine, a variable-speed induction motor connected mechanically to the pump turbine to drive it, and a cycloconverter adapted to convert line frequency into any desired frequency so that the speed of said induction motor is controlled by varying a frequency output from said cycloconverter, a method of starting up said variable-speed induction motor comprising: applying the output from said cycloconverter to the secondary winding of said induction motor while the primary winding of said induction motor is short-circuited during the start-up of said induction motor; applying a voltage lower than the line voltage to said primary winding when said induction motor is operating at a speed within an intermediate speed range; and applying the line voltage to said primary winding when said induction motor is operating at a speed near its ranged speed.

2. A method of starting up a variable induction motor according to claim 1, wherein said intermediate speed range is between 50 to 100% of the rated speed.

* * * * *